United States Patent [19]

Yamazaki et al.

[11] Patent Number: 4,871,574

[45] Date of Patent: Oct. 3, 1989

[54] PROCESS FOR PREPARING FLOUR FROM JERUSALEM ARTICHOKE TUBERS

[75] Inventors: Hiroshi Yamazaki, Nepean; Howard W. Modler, Kemptville; John D. Jones; James I. Elliot, both of Ottawa, all of Canada

[73] Assignee: Canadian Patents And Development Limited/Societe Canadienne Des Brevets Et d'Exploitation Limitee, Ottawa, Canada

[21] Appl. No.: 228,266

[22] Filed: Aug. 4, 1988

[30] Foreign Application Priority Data

Aug. 7, 1987 [CA] Canada ................... 544021

[51] Int. Cl.⁴ ............................................. A23L 1/214
[52] U.S. Cl. ..................... 426/622; 426/471; 426/804
[58] Field of Search ............... 426/615, 270, 468, 640, 426/622, 637, 468, 464, 456, 443, 804, 471

[56] References Cited

U.S. PATENT DOCUMENTS

| | | | |
|---|---|---|---|
| 3,433,668 | 3/1969 | Hein | 127/67 |
| 3,497,360 | 2/1970 | Schaefer | 426/549 |
| 4,042,719 | 8/1977 | Zimmermann nee Ignácz | 426/72 |
| 4,283,432 | 8/1981 | Mitchell | 426/594 |
| 4,565,705 | 1/1986 | Snider | 426/640 |
| 4,693,898 | 9/1987 | Nakatomi et al. | 426/62 |
| 4,699,798 | 10/1987 | MacLean | 426/596 |
| 4,758,515 | 7/1988 | Barwald | 426/51 |

FOREIGN PATENT DOCUMENTS

| | | | |
|---|---|---|---|
| 462963 | 4/1974 | Australia | 426/615 |
| 764076 | 9/1971 | France | 426/615 |
| 2089640 | 6/1982 | United Kingdom | 426/615 |

OTHER PUBLICATIONS

Cruess 1938 Commercial Fruit and Vegetable Products 2nd edition McGraw-Hill Book Company Inc. New York, pp. 502–509.

von Loesecke 1943 Drying and Dehydration of Foods, Reinhold Publishing Corp. New York 108–113.

Primary Examiner—Donald E. Czaja
Assistant Examiner—Carolyn Paden
Attorney, Agent, or Firm—Birch, Stewart, Kolasch & Birch

[57] ABSTRACT

Novel processes are provided for the preparation of useful materials from tubers of Jerusalem artichoke or similar inulin-containing plants. In one process, a flour is prepared from such tubers which comprises the steps of: macerating the tubers to a pumpable fluid homogenate, preferably in an environment of steam; heating the pumpable fluid homogenate at a temperature ranging from about 150° C. for a time ranging, respectively, from about 15 seconds to about 10 minutes; subjecting the heated, pumpable fluid homogenate to spray-drying in a stream of hot gas, and recovering a flour comprising a mixture of monosaccharides, small oligosaccharides and large oligosaccharides, e.g. about 50–60% small fructooligosaccharides and about 40–50% large oligosaccharides. In another process, a food-grade accidulant, preferably acetic acid is added, either before, during or after the macerating step to provide an acidified, pumpable fluid homogenate of such tubers. The flour recovered is sweeter than that recovered in the first described process because of the presence of more fructose therein.

35 Claims, 4 Drawing Sheets

PROCESS FOR PREPARING FLOUR FROM JERUSALEM ARTICHOKE TUBERS

BACKGROUND OF THE INVENTION (i) Field of the Invention

This invention relates to a process for the preparation of flour-like solids and fructooligosaccharides-rich flour-like solids from inulin derived from tubers of Jerusalem artichoke, and similar plants.

(ii) Description of the Prior Art

Inulin occurs as a starch-like carbohydrate in the roots of members of the family Compositae, especially Jerusalem artichoke. Jerusalem artichoke (*Helianthus tuberosus*), a native plant of Canada, grows well in northern climates and its tubers can yield per area greater amounts of carbohydrates than wheat or corn. Major carbohydrates in the Jerusalem artichoke tubers are fructose polymers (fructans) which consist of one terminal glucose and 2 to 35 fructose units (abbreviated GF2-35).

Inulin (high molecular weight fructans) has heretofore been isolated as a white amorphous hygroscopic powder having a specific gravity of about 1.35. It is less soluble in cold water than in hot water. It decomposes to caramel when heated to about 178° C. or higher, or when boiled with alkali. Furthermore, it hydrolyzes to fructose when heated with dilute acids.

The fructan-rich tubers are normally harvested in fall or in spring after wintering in the ground. A hectare of the Jerusalem artichoke field produces about 40 to about 50 tons of the tubers or about 6 to about 10 tons of the fructans. The present cost of the tubers production is estimated to be about $55 (Canadian)/ton. Although the technology has been developed for cultivation and harvesting of the Jerusalem artichoke tubers and improvement of the tuber quality, the tubers are currently being produced only on a small scale for use as a vegetable in raw or cooked forms. However, the tubers have commercial potential to produce the several commercially-interesting products.

One product that may be produced is fructose. Fructose is at least about 1.3 times sweeter and also less cariogenic than sucrose. The ingestion of normal amounts of fructose by man does not require insulin, or stimulate the release of insulin, unlike glucose or glucose-releasing sweeteners (e.g. sucrose). Thus, fructose is suitable for consumption by diabetics and calorie-conscious people who can enjoy the same sweetness with about 30% less calories. Furthermore, fructose crystallizes less rapidly than sucrose (thus giving a smoother texture in high sugar foods); chelates metal ions (responsible for off-flavor); and enhances the inherent aroma of fruit and vegetable foods.

At present, a glucose syrup of about 55% fructose content is commonly used in food products, including soft drinks (carbonated beverages). Such syrup is generally produced from corn starch via elaborate and lengthy processes: saccharification of starch by α-amylase and glucoamylase; enzymic transformation of glucose to about 42% fructose; chromatographic enrichment to about 95% fructose; and blending of the two to produce about 55% fructose. In comparison, production of high fructose syrup from the fructans in the Jerusalem artichoke tubers would be simpler as hydrolysis of the fructans produces a syrup containing up to about 80% fructose.

In fact, U.S. Pat. No. 4,613,377 issued September 23, 1986 to H. Yamazaki and K. Matsumoto provides novel, highly useful, sweet syrups consisting of fructose and various amounts of fructooligosaccharides by the partial or substantially complete hydrolysis of fructans. The process includes first providing an aqueous solution containing inulin from Jerusalem artichoke tubers or chicory roots. Then a warm aqueous solution of fructans is passed through a column of a strong acid cation-exchange resin (proton form), thereby providing an effluent having a pH of about 2.0 to about 3.0. The effluent is then hydrolyzed by heating at a temperature of about 70° C. to about 100° C., and the hydrolyzate is passed through a column of an anion-exchange resin, thereby providing an effluent having a pH of about 6.5 to about 7.0. Optionally, after the hydrolysis step, the hydrolyzate is decolorized by contact with activated or granular charcoal. The effluent is then concentrated to a syrup containing less water than the effluent, e.g. one containing about 40 to about 70% solids.

Another useful product is fructooligosaccharides. Recent Japanese studies show that small size fructooligosaccharides, e.g. $GF_{2-4}$ or F2-4, though not utilized by humans and animals, selectively stimulate growth of "beneficial" bacteria (bifido-bacteria in humans) in the lower intestine. When the bifidobacteria utilize these carbon sources, acetic and lactic acids are produced, thereby making the intestine environment more acidic. At such an acidic pH, the acids (particularly acetic acid) inhibit growth of "unfavorable" intestinal bacteria e.g. *Escherichia coli* and *Clostridium perfingens* which produce toxic, malodorous smelling substances, e.g. ammonia, amines, hydrogen sulfide, skatole and indole. Amines contribute to high blood pressure and can also react with nitrites to form carcinogenic nitrosamines. These unfavorable bacteria also possess high activity of $\beta$-glucuronidase which regenerates toxic or carcinogenic substances from their $\beta$-glucuronides, detoxification products from the liver. The acids (generated by bifidobacteria) retard not only the growth of these bacteria but also intestinal absorption of ammonia and amines by protonation and stimulate bowel movement. Bifidobacteria provide the hosts with vitamins (B1, B6, B12, pantothenic and nicotinic acids), degrade nitrosamines, and stimulate intestinal immunity against infection. Decline of the bifidobacteria population is commonly observed in unhealthy or elderly humans. Clinical studies have shown that oral administration of fructooligosaccharides increases the biofidobacteria population in the lower intestinal tract; reduces the population of "unfavorable" bacteria; and reduces constipation, blood lipids in hyperlipidemia, blood pressure, blood cholesterol and production of intestinal toxic substances. Fructooligosaccharides exist in many plants e.g. onion, asparagus, rye and banana but at relatively low levels.

Meiji Seika Ltd. of Japan has commercialized fructooligosaccharides production from sucrose by the action of *Aspergillus niger* $\beta$-fructofuranosidase (GF→GF2+GF3+GF4, etc.). Fructooligosaccharides are now widely used as an ingredient in food (drinks, confectionaries, preserves, dairy products, etc.) in Japan. As a feed ingredient, fructooligosaccharides have been used to reduce diarrhea, to improve weight gain and feed efficiency in piglets after weaning and also to reduce fecal odour of pets.

The process used by Meiji Seika to prepare fructooligosaccharides yields a large amount of glucose (e.g. about 50%) in addition to fructooligosaccharides. Removal of glucose is necessary to prepare dry powder or glucose-free products, which requires a relatively expensive chromatographic process. On the other hand, it is possible to prepare dry powder (which contains greater than about 50% fructooligo-saccharides) by partially hydrolyzing the Jerusalem artichoke fructans either with acid or with endo inulinase. Furthermore, a major monosaccharide generated from the Jerusalem artichoke fructans is fructose rather than glucose.

A major problem in commercialization of the Jerusalem artichoke tuber products is that the fresh tubers are available for only about 3 to about 4 months in a year. A year-round production requires the storage of the tubers. Although mechanical refrigeration and proprietary "liquid storage" techniques are effective in storing the tubers, the methods are expensive in terms of capital and the requirement of space and transport of the tubers into and out of storage. Although dehydration of the tuber slices permits inexpensive storage, the dehydration process proposed heretofore is slow and expensive. Furthermore, the extraction of the fructans from the dried slices requires either rehydration or energy-intensive grinding, and the recovery of the fructans is far from complete (e.g. about 50%). At present, there is no rapid and economic method for processing a larger amount of the tubers to avoid the high cost of storage.

It has been observed that many people who regularly eat Jerusalem artichoke tubers as a vegetable benefit from similar effects as observed with fructooligosaccharides. However, these benefits are not available all year round because of difficulty in storing the tubers economically. These effects should increase when the fructans are converted to smaller fructooligosaccharides which are more efficiently utilized by bifidobacteria.

It is known that the solids (about 20% of the tuber weight) in the Jerusalem artichoke tubers consist of about 60 to about 80% fructans; about 8 to about 12% proteins; about 4 to about 6% fibre; and about 4 to about 8% ash rich in potassium.

It is therefore desirable to provide Jerusalem artichoke in the form of a flour-like solid, having substantially the same content of fructans, proteins, fibre and ash as aforesaid. Unlike the tubers, the flour-like solid would be readily available to consumers throughout the year and should find greater food applications (e.g. baked foods, e.g. bread and pizza crust). Unlike the syrup, the flour-like solid can be used in dry formulations and is easier to dispense. The flour-like solid would be an ideal source of low calorie food. For diabetics, obese or elderly people, the fructooligosaccharides-rich flour-like solid is an ideal food ingredient. For pets, the fructooligosaccharides-rich flour-like solid can be added to their foods to control fecal odour and maintain health, as fructooligosaccharides also reduces production of putrefactive substances in the intestine of the pet. For piglets, the flour-like solid can be added to the milk replacer to reduce diarrheas of bacterial origin.

Jerusalem artichoke flour-like solid is currently produced on an experimental basis by drying the sliced tubers at 50°–80° C. for several hours and "hammer" milling the dried (hardened) slices. This method is slow and energy intensive, and may also generate undesirable color and off-flavor partly due to the oxidation of tuber phenolic acids by polyphenol oxidase.

Canadian Patent No. 358,340 issued June 9, 1936 by J. W. Reavell provided a process for producing fruit and vegetable products. The patented process involved subjecting pulp of a predetermined consistency and derived from whole fruit or vegetables, subjected to a certain preliminary treatment, to a spray drying operation under carefully regulated conditions. The preliminary treatment involved subjecting the whole fruit or vegetable to a mincing, crushing or chopping operation to provide a pulp. The pulp was then further subjected to two or more treatments through disintegrating machines or mills to reduce the pulp to a finely divided condition. The cold, finely divided pulp was passed or pumped to a spraying or atomising apparatus wherein the spray produced was brought into direct contact with a heated aeriform or gaseous medium where it was heated for the first time to evaporate the moisture, and to provide a powdered fruit or vegetable product.

Marchand U.S. Pat. No. 2,555,356 related to a method for the preparation of inulin. Previous procedures for producing inulin are also described therein, which generally involved extracting ground dry Jerusalem artichoke tubers with hot water. The patented process involved centrifugal clarification of the syrupy juice pressed from ground Jerusalem artichoke tubers. Dry powder was produced by crystallization from acetone.

Hill U.S. Pat. No. 2,834,694 patented May 13, 1958 provided a process for preparing fructose polymers from inulin or inulin-containing plants. The patented process involved first extracting slices of the inulin-containing plant with an organic extraction solvent. The residual inulin in the extracted slices was then extracted with warm water followed by precipitation of the inulin. Then the inulin was hydrolyzed with heat in the presence of a weak acid.

It is known that Jerusalem artichoke tubers contain polyphenols and active polyphenol oxidases which catalyze the oxidation of the polyphenols to the corresponding quinones in the presence of oxygen. The resulting reactive quinones couple with amino acids and proteins, generating brown coloration (discoloration).

In the past, it was suggested that such discoloration could be prevented by passage of sulfur dioxide or by the addition of sodium metabisulfite to a macerate of Jerusalem artichoke tubers. While this technique is suitable to prevent discoloration, such added compounds generate off-flavors in products, corrosion in equipment and their use is prohibited in some countries.

It was also suggested that such discoloration could be prevented by the addition of ascorbic acid, which prevents discoloration by reducing the quinones. However, this technique is not suitable because relatively large amounts of ascorbic acid are required, thus increasing the cost of production.

SUMMARY OF THE INVENTION (i) Aims of the Invention

One object therefore of the present invention is to provide a rapid process for producing a flour-like solid from Jerusalem artichoke tubers or similar plants which retains all of the above-mentioned components of dietary value, so that it can be used in food and also serve as a starting material for production of fructose and fructooligosaccharides.

It is known that the fructans from Jerusalem artichoke tubers or similar plants can be hydrolyzed by endoinulinase to produce fructooligosaccharides. However, enzymic hydrolysis is generally slow unless high concentration of the enzymes are used, and thus increases the holding time of macerated tubers when it is included in processing of the fresh tubers. For enzymic production of fructooligosaccharides, it would be more economical first to reduce the tubers to a flour-like solid as above described and then to use such flour-like solid as a starting material.

Another object of the present invention then is to provide a process for producing a fructose-rich, sweeter, flour-like solid from Jerusalem artichoke tubers.

Another object of the invention then is to provide such processes which have been modified to minimize or even to prevent the discoloration of the Jerusalem artichoke tuber flour-like products.

(ii) Statements of Invention

The present invention provides a process including the steps of wet maceration of the tubers of Jerusalem artichoke or similar plants to a pumpable fluid of sufficient fineness so as to pass through a spray nozzle, preferably under pressure, and then drying such fluid, i.e. by subjecting to spray drying in a stream of hot gas, so that a free-flowing, flour-like solid may be recovered.

This invention therefore provides a process for the preparation of a flour from the inulin in tubers of Jerusalem artichoke or similar inulin-containing plants, which process comprises the steps of: (a) macerating the tubers to a homogenate; (b) heating the homogenate at a temperature ranging from about 150° C. to about 90° C. for a time ranging, respectively from about 15 seconds to about 10 minutes; (c) subjecting the heated homogenate to spray drying in a stream of hot gas; and (d) recovering a flour comprising a mixture of monosaccharides, small oligosaccharides and large oligosaccharides.

This invention also provides a process for the preparation of a fructose-rich, flour from inulin in tubers of Jerusalem artichoke or similar inulin-containing plants, which process comprises the steps of: (a) macerating the tubers to a homogenate; (b) adding a non-toxic food-grade acidulant either before, during or after the macerating step to provide an acidified, homogenate of the tubers; heating the homogenate at a temperature ranging from about 150° C. to about 90° C. for a time ranging, respectively from about 15 seconds to about 10 minutes; (c) subjecting the heated homogenate to spray drying in a stream of hot gas; and (d) recovering a flour comprising a mixture of monosaccharides, small oligosaccharides and large oligosaccharides, and also including fructose.

The present invention is also based on the discovery that the discoloration of the Jerusalem artichoke tuber products during maceration can effectively be prevented by injecting steam to the diced tubers before they reach the macerator. Thus this invention also provides a process including the steps of wet maceration of the tubers of Jerusalem artichoke or similar plants in an environment of steam to a pumpable fluid of sufficient fineness so as to pass through a spray nozzle or spinning disc, preferably under pressure, and drying such pumpable fluid, i.e. by subjecting it to spray drying in a stream of hot gas, so that a free-flowing, flour is recovered.

(iii) Other Features of the Invention

In all the embodiments of the invention described above, the macerating step preferably includes the steps of: (i) washing the Jerusalem artichoke tubers; (ii) dicing the washed Jerusalem artichoke tubers; (iii) macerating the diced, washed Jerusalem artichoke tubers to medium sizes; and (iv) further macerating the medium sized macerate of Jerusalem artichoke tubers to fine sizes.

The maceration should take place to provide a pumpable fluid having at least about 80% by weight water therein. It should be carried out in two stages, first to a maximum particle size of about 3.2 mm and then to a finer particle size of about 0.03 to about 0.05 mm.

The time and temperature for the heating step are interdependent: ranging from about 15 secs. at about 150° C. to about 10 minutes at about 90° C. The heating step is preferably carried out by steam injection.

The flour-like solid produced according to one embodiment of the present invention comprises about 60% to about 80% of a mixture of fructose and fructans, about 8 to about 12% proteins, about 4 to about 6% fibre and about 4 to about 8% ash rich in potassium.

While any non-toxic food-grade acidulant, e.g. tartaric acid, citric acid, fumaric acid, lactic acid, malic acid or hydrochloric acid can be used, acetic acid is preferred. The acetic acid is preferably added to provide a pH of about 3.5 to about 5.5.

(iv) Generalized Description of the Invention

There are many advantages to the process of embodiments of this invention. Compared to the dried tuber slices, the wet tubers can be more readily reduced to fine particles, thus utilizing less energy. Unlike the tuber slices, the resulting homogenate can be subjected to spray-drying, thus permitting rapid and substantially-complete drying. Rapid heating between homogenization and spray-drying is essential in the process of this aspect of the invention to inactivate tuber polyphenol oxidase, thereby to reduce production of color and off-flavor. Discoloration can be further reduced by using nitrogen or carbon dioxide blanketing during maceration. The process rapidly converts the Jerusalem artichoke to a stable product of about 1/5 the original weight. With appropriate uses of macerators, heater and spray-dryers, it is possible to carry out the entire process continuously within about 15 minutes.

Since the flour-like solid from Jerusalem artichoke can be readily stored in a stable state at room temperature, such flour-like solid is an ideal starting material for commercial production of fructose and fructose-rich solids throughout the year and independent of season.

It has also been found that macerating the Jerusalem artichoke tubers in an environment of steam is unexpectedly useful for several reasons. Firstly, the steam environment reduces discoloration by displacing oxygen-containing air to the inlet of the macerator. Secondly, the heat in the steam inactivates oxidases. Thirdly, the moisture generated from condensation of the steam provides lubrication for the macerating step (thereby, eliminating the need of adding water.)

A sweeter fructose-rich, flour-like solid is produced by carrying out an acid hydrolysis step prior to spray-drying during flour-like production. A small amount (e.g. about 1/1000 to about 1/100 parts) of glacial acetic acid is added to one part of the tuber either before, during or after maceration. Acid addition can be achieved on a continuous basis. The acidified homogenate is heated for an appropriate length of time, either by transporting it through a heated tube of the required length, or by direct steam injection. Heating temperatures under about 100° C. (e.g. about 95° C.) should be used at atmospheric pressure, but higher temperatures, eg. about 100° C. to about 150° C., may be used under superatmospheric pressure. Use of higher temperature will permit use of smaller quantities of the acid and also shorten the time of hydrolysis required for fructooligosaccharides generation, since it is known that the reaction rate doubles for every 10° C. rise in temperature. Although any non-toxic, food grade acid can be used, acetic acid is preferred because it is volatile and thus can be removed during spray-drying, requiring no post-treatment, e.g. neutralization. The presence of proteins and fiber in the homogenate facilitate the drying of hydrolyzed fructans, (fructose, glucose and fructooligosaccharides).

Sweeter, fructose-rich, flour-like solids which, however, are substantially free of discoloration, may be produced by maceration in a steam environment and carrying out an acid hydrolysis step prior to the spray-drying step.

In contrast to enzymic hydrolysis, acid-catalyzed hydrolysis of the fructans proceeds much more rapidly at elevated temperatures, as taught in the above identified Yamazaki and Matsumoto U.S. Pat. No. 4,613,377.

BRIEF DESCRIPTION OF THE DRAWINGS

In the accompanying drawings.

Figure 1:
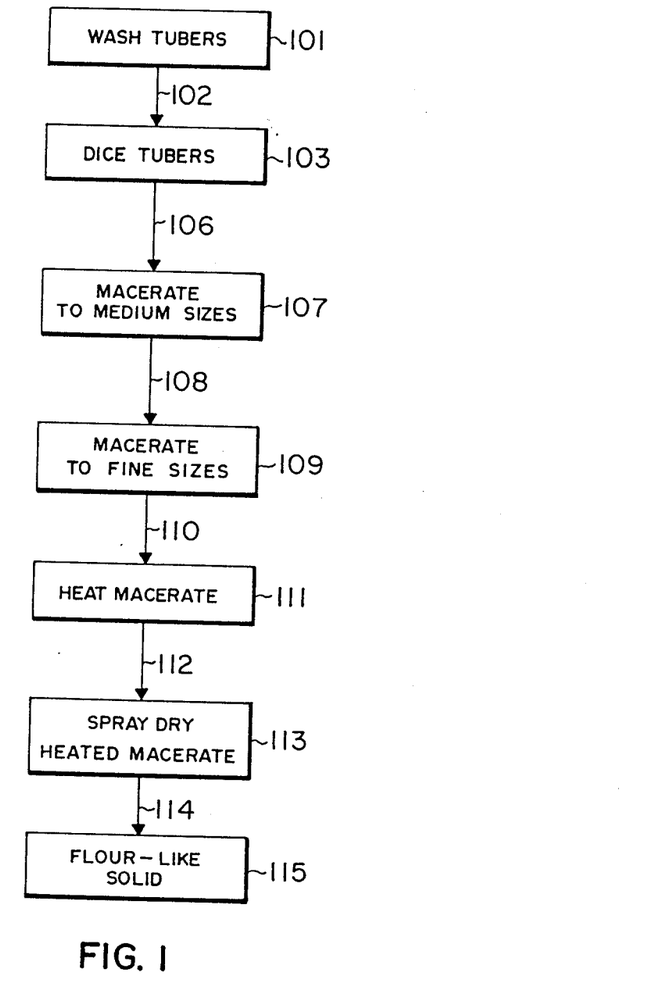
FIG. 1 is a flow diagram for production of a flour-like solid from Jerusalem artichoke tubers according to one embodiment of this invention.

DESCRIPTION OF THE DRAWINGS (i) Description of FIG. 1

As seen in FIG. 1, the first step involves washing the tubers in a washing zone 101. Then the tubers are subjected to a staged reduction of size. The first step in such staged reduction in size involves conveying the tubers, as shown by 102 to a dicing zone 103 where the tubers are subjected to dicing, e.g. to about 1 cm cubes, e.g. in a URCHELL dicer or equivalent, commercially-available apparatus.

The next step in such staged reduction in size involves conveying the diced tubers, as shown by 106 to a macerating zone 107 where the diced product is subjected to maceration, e.g. in a FITZMILL Model M, fitted with a reversible comminuting chamber, operated with its impact edge forward for pulverizing at about 1740 R.P.M. to provide a product passing through a #3 screen (a screen having holes 3.18 mm in size). Any equivalent, commercially-available wet hammermill, crusher, screw press extractor or disintegrating mill or dispenser may be used instead of the FITZMILL.

The final step in such staged reduction in size involves further wet macerating the preliminarily macerated product produced above, e.g. by passing it as shown by 108 through a second maceration zone 109, e.g. a VIBRIOREACTOR Model JMM/0/25 (PUC120K) with a cross-cut head operated at a head clearance to provide a particle size of about 0.03 to about 0.05 mm.

This provides a macerated homogenate in the form of a pumpable fluid having at least about 80% by weight liquid (water) therein. This macerated homogenate is then conveyed, as shown by 110, to a heating zone 111 where it is heated for an interrelated period of time and temperature. Suitable such interrelationships of time and temperature range from about 10 minutes at about 90° C. at atmospheric pressure to about 15 seconds at about 150° C. at superatmospheric pressure. This heating is essential to complete the inactivation of enzymes and thus to prevent enzyme decolorization during the spray drying steps. The heating preferably is carried out in a tube by steam injection at about 150 p.s.i. However, any equivalent commercially-available heater, e.g. a high temperature, short time, pasteurizer, or tubular heat exchanger or CONTHERM scraped surface heater, may be used.

The heated homogenate is then conducted, as shown by 112 to a spray-drying zone 113 where it is spray-dried. Any commercially-available spray drying apparatus may be used. However, the spray drying procedure used involves pumping the heated macerate through a high pressure pump at a pressure of about 1500 to about 1800 psi using a SX type, #66–69 nozzle with 4–16 insert into a ROGERS inverted tear drop co-current spray dryer. The spray dryer had an inlet temperature of about 150° C. to about 220° C. and an exit temperature of about 70° C. to about 90° C.

The presence of proteins and fiber in the homogenate facilitate the production as shown by 114 of the flour-like solids, at zone 115, in spite of the deliquescence of hydrolyzed fructan.

Figure 2:
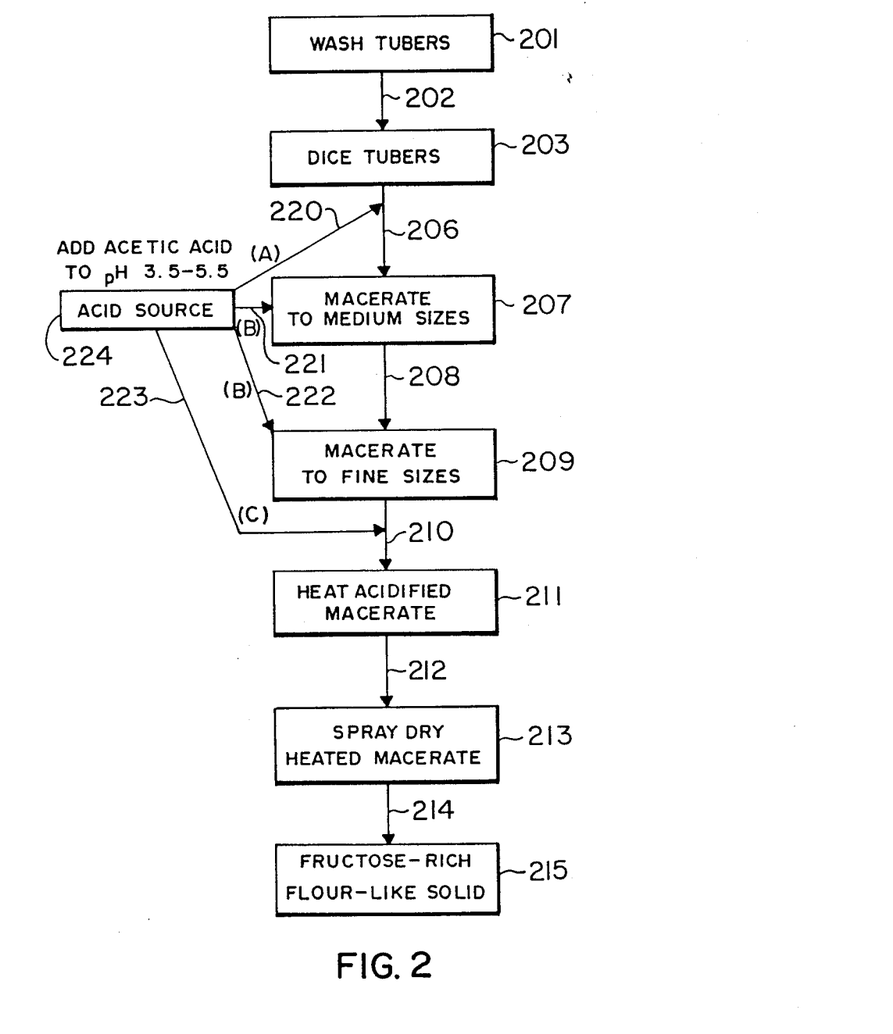
FIG. 2 is a flow diagram for production of a sweeter, fructose-rich, flour-like solid from Jerusalem artichoke tubers according to another embodiment of this invention.

(ii) Description of FIG. 2

As seen in FIG. 2, and as in the first steps of the process of FIG. 1, the first step involves washing the tubers at a washing zone 201. Then the tubers are subjected to a staged reduction of size. The first step in such staged reduction in size involves conveying the tubers, as shown by 202, to a dicing zone 203, where the tubers are subjected to dicing, e.g. to about 1 cm cubes, e.g. in a URCHELL dicer or equivalent commercially-available apparatus.

The next step in such staged reduction in size involves conveying the diced tubers, as shown by 206 to a macerating zone 207 where the diced product is subjected to maceration, e.g. in FITZMILL Model M, fitted with a reversible comminuting chamber, operated with its impact edge forward for pulverizing at about 1740 R.P.M. to provide a product passing through a #3 screen (a screen having holes 3.18 mm in size). Any equivalent, commercially-available wet hammermill, crusher, screw press extractor or disintegrating mill or dispenser may be used instead of the FITZMILL.

The final step in such staged reduction in size involves further wet macerating the macerated product produced above, e.g. by passing it as shown by 208 through a second maceration zone 209, e.g. a VIBRIOREACTOR Model JMM/0/25 (PUC120K) with a cross-cut head operated at a head clearance to provide a particle size of 0.03–0.05 mm.

A small amount (e.g. about 1/1000 to about 1/100 parts) of glacial acetic acid is added to one part of the tuber either before (as shown at 220 at step A), or during (as shown at 221 and 222 at macerating steps B), or after maceration (as shown at 223 at step C), or at any two or three of steps A, B, and C. Acid for such purpose is fed from acid source 224. Acid addition can be achieved on a continuous basis. After acid addition/maceration, an acidified macerated homogenate is provided in the form of a pumpable fluid with a liquid (water) content of at least about 80% by weight.

The acidified, homogenate is then led, as shown at 210, to a heating zone 211, where it is heated for an interrelated period of time and temperature. Suitable such interrelationships of time and temperature range from about 10 minutes at about 90° C. at atmospheric pressure to about 15 seconds at about 150° C. at superatmospheric pressure. This heating is essential to complete the inactivation of enzymes and to prevent enzyme discolorization during the spray drying step. The heating preferably is carried out in a tube with steam injection at about 150 p.s.i. However, any equivalent commercially-available heater, e.g. a high temperature, short time pasteurizer, or tubular heat exchanger or CONTHERM scraped surface heater, may be used.

Use of higher temperature will permit use of smaller quantities of the acid and also shorten the time of hydrolysis required for fructooligosaccharides generation since it is known that the reaction rate doubles for every 10° C. rise in temperature. Thus the quantity of acid is inversely proportional to the temperature, varying from about 1/1000 to about 1/100 parts per part of heated, acidified macerate. Although any non-toxic, food-grade acid can be used, acetic acid is preferred because it is volatile and thus can be removed during spray-drying, requiring no post-treatment, e.g. neutralization.

The heated, acidified, homogenate is then conducted, as shown by 212 to a spray drying zone 213, where it is spray-dried. Any commercially-available spray drying apparatus may be used. However, the spray drying procedure used involves pumping the heated macerate through a high pressure pump at a pressure of about 1500 to about 1800 psi using a SX type, #66–69 nozzle with 4–16 insert into a ROGERS inverted tear drop co-current spray dryer. The spray dryer had an inlet temperature of about 150° C. to about 220° C. and an exit temperature of about 70° C. to about 90° C.

The presence of proteins and fiber in the homogenate facilitate the production as shown by 214 of the fructose-rich flour-like hydrolyzed solid fructans (fructose, glucose and fructooligosaccharides) in a sweeter, fructose-rich flour-like solid zone 215.

Figure 3:
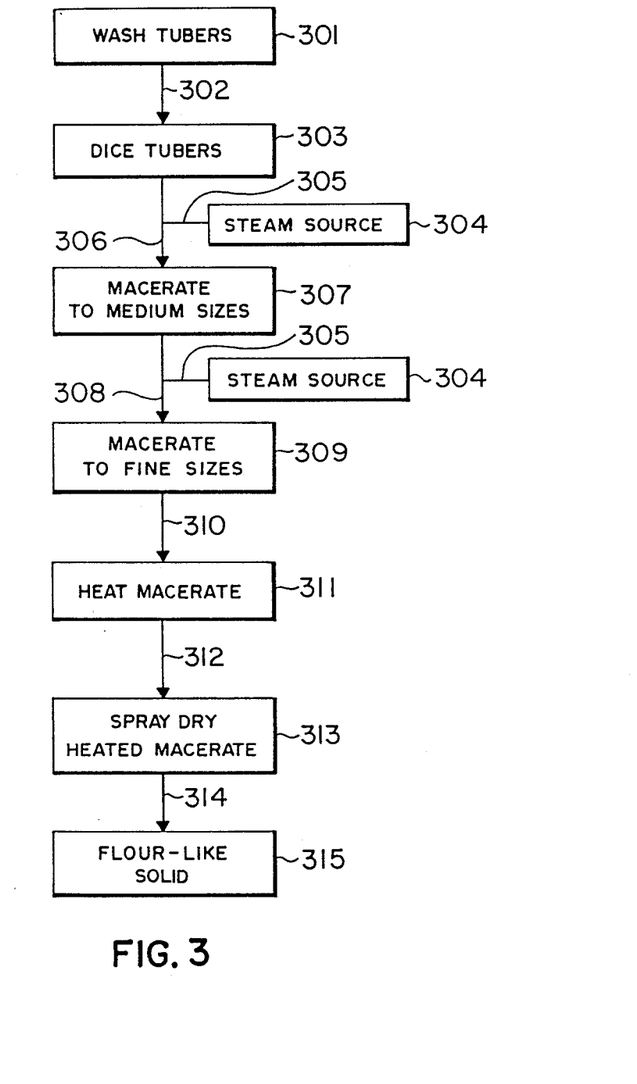
FIG. 3 is a flow diagram for the production of a flour-like solid from Jerusalem artichoke tubers according to another embodiment of this invention.

(iii) Description of FIG. 3

As seen in FIG. 3, the first step involves washing the tubers in a washing zone 301. Then the tubers are subjected to a staged reduction of size. The first step in such staged reduction in size involves conveying the tubers, as shown by 302, to a dicing zone 303 where the tubers are subjected to dicing, e.g. to about 1 cm cubes, e.g. in a URCHELL dicer or equivalent, commercially-available apparatus.

The next step in such staged reduction in size involves intermixing the diced tubers at 306 with an environment of steam at 305 from steam source 304. The next step in such staged reduction in size involves conveying the diced tubers, while still in such environment of steam, as shown by 306, to a macerating zone 307 where the diced product is subjected to maceration, e.g. in a FITZMILL Model M, fitted with a reversible comminuting chamber, operated with its impact edge forward for pulverizing at about 1740 R.P.M. to provide a product passing through a #3 screen (a screen having holes 3.18 mm in size). Any other equivalent, commerically-available wet hammermill, crusher, screw press extractor or disintegrating mill or dispenser may be used instead of the FITZMILL.

The final step in such staged reduction in size involves further wet macerating the preliminarily macerated product produced above while still in an environment of steam, admitted along line 305 from steam source 304, e.g. by passing it, as shown by 308, through a second maceration zone 309, e.g., a VIBRIOREACTOR Model JMM/0/25 (PUC120K) with a cross-cut head operated at a head clearance to provide a particle size of about 0.03 to about 0.05 mm.

This provides a macerated homogenate in the form of a pumpable fluid having at least about 80% by weight liquid (water) therein. This macerated homogenate is then conveyed, as shown by 310, to a heating zone 311 where it is heated for an interrelated period of time and temperature. Suitable such interrelationships of time and temperature range from about 10 minutes at about 90° C. at atmospheric pressure to about 15 seconds at about 150° C. at superatmospheric pressure. This heating is essential to complete the inactivation of enzymes and thus to prevent enzyme decolorization during the spray drying step. The heating preferably is carried out in a tube by steam injection at about 150 p.s.i. However, any equivalent commercially-available heater, e.g. a high temperature, short time, pasteurizer, or tubular heat exchanger or CONTHERM scraped surface heater, may be used.

The heated homogenate is then conducted, as shown by 312 to a spray drying zone 313 where it is spray-dried. Any commercially-available spray drying apparatus may be used. However, the spray drying procedure actually used involves pumping the heated macerate through a high pressure pump at a pressure of about 1500 to about 1800 psi using a SX type, #66–69 nozzle with 4–16 insert into a ROGERS inverted tear drop co-current spray dryer. The spray dryer had an inlet temperature of about 150° C. to about 220° C. and an exit temperature of about 70° C. to about 90° C.

The presence of proteins and fiber in the homogenate facilitate the production as shown by 314 of the flour-like solids, in a flour-like solid zone 315, in spite of the deliquescence of hydrolyzed fructan.

Figure 4:
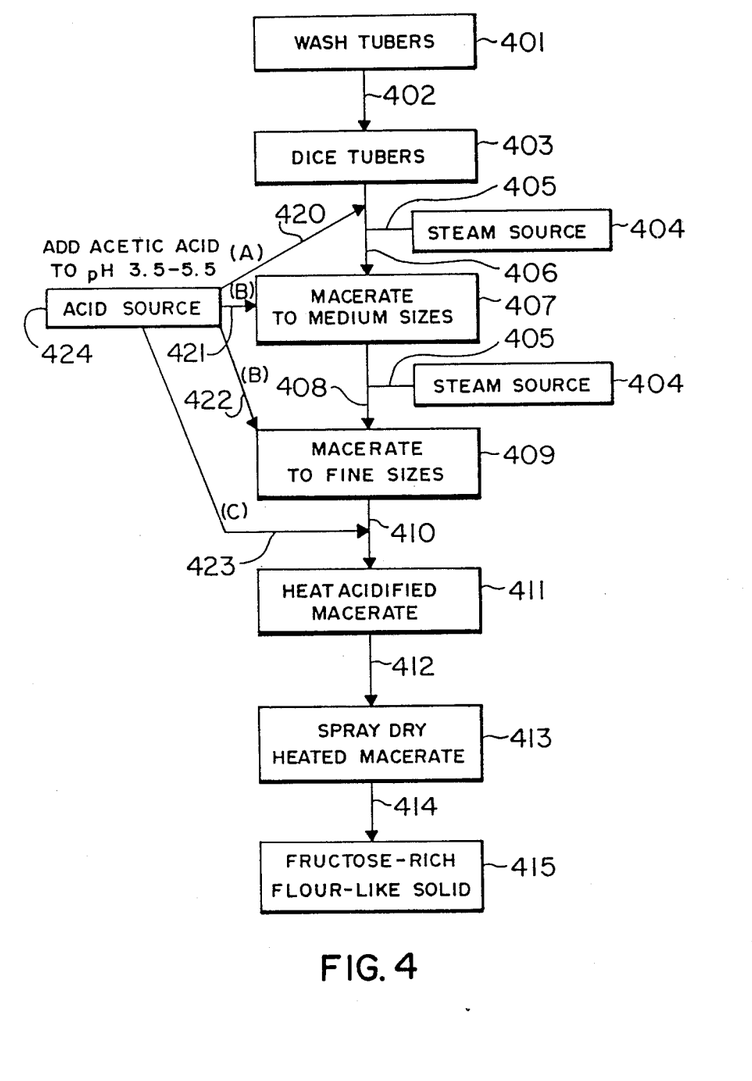
FIG. 4 is a flow diagram for the production of a sweeter, fructose-rich, flour-like solid from Jerusalem artichoke tubers according to another embodiment of this invention.

(iv) Description of FIG. 4

As seen in FIG. 4, and as in the first steps of the process of FIG. 3, the first step involves washing the tubers at washing zone 401. Then the tubers are subjected to a staged reduction of size. The first step in such staged reduction in size involves conveying the tubers, as shown by 402, to a dicing zone 403 where the tubers are subjected to dicing, e.g. to about 1 cm cubes, e.g. in a URCHELL dicer or equivalent, commercially-available apparatus.

The next step in such staged reduction in size involves intermixing the diced tubers, at 406 with an environment of steam along line 405 from steam source 404. The next step in such staged reduction in size involves conveying the diced tubers, while still in their environment of steam, as shown by 406, to a macerating zone 407 where the diced product is subjected to maceration, e.g. in a FITZMILL Model M, fitted with a reversible comminuting chamber, operated with its impact edge forward for pulverizing at about 1740 R.P.M. to provide a product passing through a #3 screen (a screen having holes 3.18 mm in size). Any equivalent, commercially-available wet hammermill, crusher, screw press extractor or disintegrating mill or dispenser may be used instead of the FITZMILL.

The final step in such reduction in size involves further wet macerating the macerated product produced above while it is still in their environment of steam, admitted along line 405 from steam source 404, e.g. by passing it, as shown by 408, through a second maceration zone 409, e.g., a VIBRIOREACTOR Model JMM/0/25 (PUC120K) with a cross-cut head operated at a head clearance to provide a particle size of about 0.03 to about 0.05 mm.

A small amount (e.g. about 1/1000 to about 1/100 parts) of glacial acetic acid is added to one part of the diced tubers either before (as shown at 420 at step A), or during (as shown at 421 and 422 at macerating step B), or after maceration (as shown at 423 at step C), or at any two or three of steps A, B, and C. Acid for such purpose is fed from source 424. Acid addition can be achieved on a continuous basis. After acid addition/maceration, still in an environment of steam, an acidified homogenate is provided in the form of a pumpable fluid with a liquid (water) content of at least about 80% by weight.

The acidified, homogenate is then led, as shown at 410, to a heating zone 411, where it is heated for an interrelated period of time and temperature. Suitable such interrelationships of time and temperature range from about 10 minutes at 90° C. at atmospheric pressure to about 15 seconds at about 150° C. at superatmospheric pressure. This heating is essential to complete the inactivation of enzymes and to prevent enzyme discolorization during the spray drying process. The heating preferably is carried out in a tube with steam injection at about 150 p.s.i. However, any equivalent commercially-available heater, e.g. a high temperature, short time pasteurizer, or tubular heat exchanger or CONTHERM scraped surface heater, may be used.

Use of higher temperatures will permit use of smaller quantities of the acid and also shorten the time of hydrolysis required for fructose generation since it is known that the reaction rate doubles for every 10° C. rise in temperature. Thus the quantity of acid is inversely proportional to the temperature, varying from about 1/1000 to about 1/100 parts per part of heated, acidified homogenate. Although any non-toxic, food-grade acidulant can be used, acetic acid is preferred since it is volatile and thus can be removed during spray-drying, thereby requiring no post-treatment, e.g. neutralization.

The heated, acidified, homogenate is then conducted, as shown by 412, to a spray-drying zone 413, where it is spray-dried. Any commercially-available spray drying apparatus may be used. However, the spray drying procedure actually used involves pumping the heated macerate through a high pressure pump at a pressure of about 1500 to about 1800 psi using a SX type, #66-69 nozzle with 4-16 insert into a ROGERS inverted tear drop co-current spray dryer. The spray dryer had an inlet temperature of about 150° C. to about 220° C. and an exit temperature of about 70° C. to about 90° C.

The presence of proteins and fiber in the homogenate facilitate the production as shown at 414 of the fructose-rich flour-like, hydrolyzed solid fructans (fructose, glucose or fructooligosaccharides), in a sweeter, fructose-rich, flour-like solids zone 415.

EXAMPLES OF THE INVENTION

Example 1

An example of the acetic acid treatment of macerated Jerusalem artichoke tubers to provide fructooligosaccharides includes the step of heating a macerated homogenate of the Jerusalem artichoke tubers by steam injection to about 95° C. About 1/100 parts by volume of glacial acetic acid was then added at zero time. The mixture was heated at about 95° C. for either zero minutes or about 60 minutes, and then was spray-dried to a flour-like solid. The results are shown below in Table 1.

TABLE 1

| Degree of Hydrolysis of Jerusalem Artichoke Tuber Fructans | |
|---|---|
| Acetic acid treatment | Reducing sugar/total fructose |
| 0 minutes | 0.02 |
| 20 minutes | 0.11 |
| 60 minutes | 0.29 |

The samples of flour-like solid were analyzed for reducing sugars by the 3,5-dinitrosalicylate method and for total fructose by the cysteine-carbazole-sulfuric acid method. Higher ratios of reducing sugar to total fructose indicate greater degrees of hydrolysis. Complete hydrolysis results in the ratio of about 1.3. A ratio of about 0.02 corresponds to monosaccharide content of about 2%; a ratio of about 0.11 corresponds to a fructooligosaccharides content of about 91%; and a ratio of about 0.29 corresponds to a fructooligosaccharides content of about 78%.

Analysis of the composition of soluble carbohydrates in the tubers before and after hydrolysis were made. In order to carry out such analysis, 1 part of glacial acid was added to 100 parts of the tubers. Heating at higher temperatures (about 100° C. to about 140° C.) with a 12 minute holding time was carried out prior to spray drying. The results are set out in the following Table 2.

TABLE 2

| | | Composition of Soluble Carbohydrates in the Tubers Before And After Hydrolysis | | | | | | |
|---|---|---|---|---|---|---|---|---|
| Treatments | | Composition(%) of mono- and oligosaccharides | | | | | | % of small oligosaccharides |
| Acid | Heating (temperature) | dp = 1 | dp = 2 | dp = 3 | dp = 4 | dp = 5 | dp > 5 | (dp = 2-5) |
| — | — | 3.2 | 18.0 | 14.8 | 13.1 | 11.2 | 39.5 | 57.1 |
| + | — | 9.9 | 18.3 | 12.8 | 11.0 | 8.3 | 39.6 | 50.4 |
| + | +(100° C.) | 8.3 | 18.9 | 12.8 | 11.8 | 9.4 | 38.7 | 52.9 |
| + | +(110° C.) | 10.1 | 20.4 | 12.9 | 11.6 | 9.4 | 37.7 | 54.3 |
| + | +(120° C.) | 14.5 | 22.7 | 13.0 | 11.3 | 9.2 | 29.4 | 56.2 |
| + | +(130° C.) | 26.3 | 27.2 | 12.3 | 9.6 | 7.6 | 16.9 | 56.7 |
| + | +(140° C.) | 46.8 | 29.0 | 9.3 | 5.9 | 4.1 | 4.9 | 48.3 |

As a result of these analyses, it may be concluded that the soluble carbohydrates of the Jerusalem artichoke tubers are comprised of about 50 to about 60% small FOS (fructooligosaccharides) of dp=2-5, the remainder being large FOS (dp>5). Spray drying results in the production of a free flowing flour. The small FOS are useful in that they support the growth of beneficial bacteria more efficiently.

The heat treatment (about 100° C. to about 140° C. with about 12 min holding time) on the acidified Jerusalem artichoke tuber homogenate (about 1/100 part of glacial acetic acid added to 1 part of the diced tubers) leads to only a slight increase of the small FOS (as compared to acid-treated unheated control) at about 100° C. to about 130° C.). The small FOS decreases as the heating temperature increases to about 140° C. Hydrolysis leads to increased monosaccharides (largely fructose) and disaccharides and decreased amount of higher FOS; thus hydrolysis leads to increased sweetness. Extensive hydrolysis results in hygroscopic, sticky and clumpy flour.

CONCLUSION

The flour-like solid can be used as a starting material for commercial production of fructose and fructooligosaccharides. Both the Jerusalem artichoke flour-like solid and the fructooligosaccharides-rich flour-like solid, when mixed with wheat or other flour, can be used in baked foods (e.g. bread and pizza crust). These flours contain considerable amounts of carbohydrates which are fermentable by yeast. Since wheat flour is low in α-amylase, commercial production of leavened products usually requires supplementation of α-amylase or sucrose to yield adequate gassing power of yeast during baking. Use of the flour-like solid from Jerusalem artichoke tubers will reduce the amount of such supplementation. Fructans and fructooligosaccharides in the products will not add calories to a consumers' diet as they cannot be metabolized by humans, but do stimulate growth of "beneficial" intestinal bacteria. Thus, the flour-like solid can be used as an ingredient of foods for people who are prone to obesity, diabetes, constipation, and diseases related to high cholesterol and high blood pressure. The flour-like solid also provides proteins, fiber and potassium which are important dietary components. The flour-like solid ensures availability of these dietary substances to the consumers at reasonable costs all year-round.

The fructooligosaccharides-rich, flour-like solid can be applied as an agent to be used in milk replacers for piglets. The neonatal piglet depends on mother's milk containing immunoglobulins which confer passive immunity against disease until weaning at about 3 to about 5 weeks of age. On an average, about 1 to about 2 piglets per litter of about 8 to about 10 are lost between birth and weaning primarily because of the inability of the piglet to obtain sufficient immunoglobulin-rich milk leading to susceptibility to bacterial disease (e.g. *E. coli* scour). This results from problems at lactation, extra large litters, competition within the litter, poor nursing sows, etc. Clearly a milk replacer which can supplement mother's milk is beneficial to pig breeders. Inclusion of the fructooligosaccharides-rich flour in the milk replacer will suppress growth of harmful bacteria including *E. Coli* (major cause of diarrhea) by stimulating growth of beneficial bacteria (e.g. Streptococcus and Lactobacillus). Sweetness due to monosaccharides and low molecular weight fructooligosaccharides will increase palatability of the milk replacer.

Heating of sliced (or diced) tubers in an environment of steam reduces discoloration and development of off-flavour.

It has been found that untreated Jerusalem artichoke flour is a good source of small FOS and other nutrients. The heat treatment of acidified homogenate increases sweetness. A product of increased sweetness provides a good base for palatable animal feeds. The discolorization (and off-flavour development) can be prevented by the use of an environment of steam.

As a result of the present invention, a number of advantages accrue. The invention provides rapid conversion of perishable Jerusalem artichoke tubers to stable products, namely unhydrolyzed flour and partially hydrolyzed flour.

The hydrolyzed flour provides a "health" flour for human and animals; a milk replacer ingredient; the starting material for the production of small FOS (with or without the use of enzymes); and the starting material for the production of fructose syrup containing small FOS.

The partially hydrolyzed flour can be used as an animal milk replacer. It can also be used as the flour for leavened baked products.

Thus, in the countries having a climate similar to that of Canada, Jerusalem artichoke can be an alternative crop to wheat, potatoes or tobacco which can be competitively grown and which has the potential to generate new products.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A process for the preparation of flour from the inulin in tubers of Jerusalem artichoke or similar inulin-containing plants, which process comprises the steps of:
   (a) macerating said tubers to a homogenate;
   (b) heating said homogenate at a temperature ranging from about 150° C. to about 90° C. for a time ranging, respectively from about 15 seconas to about 10 minutes;
   (c) subjecting said heated homogenate to spray drying in a stream of hot gas; and
   (d) recovering a flour comprising a mixture of monosaccharides, small oligosaccharides and large oligosaccharides.

2. The process of claim 1 wherein said step of macerating said tubers to a homogenate takes place in an environment of steam.

3. The process of claim 1, wherein said macerating step includes the steps of:
   (i) washing said Jerusalem artichoke tubers;
   (ii) dicing said washed Jerusalem artichoke tubers;
   (iii) macerating said diced, washed, Jerusalem artichoke tubers to medium sizes; and
   (iv) further macerating said medium sized, macerated Jerusalem artichoke tubers to fine sizes,
thereby to provide a pumpable, fluid homogenate of at least about 80% by weight liquid.

4. The process of claim 2 wherein said macerating step includes the steps of:
   (i) washing said Jerusalem artichoke tubers;
   (ii) dicing said washed Jerusalem artichoke tubers;
   (iii) macerating said diced, washed, Jerusalem artichoke tubers to medium sizes; and
   (iv) further macerating said medium sized, macerated Jerusalem artichoke tubers to fine sizes,
thereby to provide a pumpable, fluid homogenate of at least about 80% by weight liquid.

5. The process of claim 3 wherein said dicing step provides cubes of about 1 cm in size.

6. The process of claim 4 wherein said dicing step provides cubes of about 1 cm in size.

7. The process of claim 5 wherein said macerating to medium sizes provides solids having a maximum size of about 3.2 mm.

8. The process of claim 6 wherein said macerating to medium sizes provides solids having a maximum size of about 3.2 mm.

9. The process of claim 7 wherein said macerating to fine sizes provides solids having a size of about 0.03 to about 0.05 mm.

10. The process of claim 8 wherein said macerating to fine sizes provides solids having a size of about 0.03 to about 0.05 mm.

11. The process of claim 1, wherein said heating step is carried out by steam injection.

12. The process of claim 2, wherein said heating step is carried out by steam injection.

13. The process of claim 1 wherein said flour comprises about 3% monosaccharides, about 50-60% small fructooligosaccharides and about 47-37% large oligosaccharides.

14. A process for the preparation of flour from the inulin in tubers of Jerusalem artichoke or similar inulin-containing plants, which process comprises the steps of:
    (a) macerating said tubers to a homogenate;
    (b) adding a non-toxic food-grade acidulant either before, during or after the macerating step to provide an acidified, homogenate of the tubers; heating the homogenate at a temperature ranging from about 150° C. to about 90° C. for a time ranging, respectively from about 15 seconds to about 10 minutes; heating said homogenate at a temperature ranging from about 150° C. to about 90° C. for a time ranging, respectively from about 15 seconds to about 10 minutes;
    (c) subjecting said heated homogenate to spray drying in a stream of hot gas; and
    (d) recovering a flour comprising a mixture of monosaccharides, small oligosaccharides and large oligosaccharides.

15. The process of claim 14, wherein said step of macerating said tubers to a homogenate takes place in an environment of steam.

16. The process of claim 14, wherein said macerating step includes the steps of:
    (i) washing said Jerusalem artichoke tubers;
    (ii) dicing said washed Jerusalem artichoke tubers;
    (iii) macerating said diced, washed, Jerusalem artichoke tubers to medium sizes; and
    (iv) further macerating said medium sized, macerated Jerusalem artichoke tubers to fine sizes,
thereby to provide a pumpable, fluid homogenate of at least about 80% by weight liquid.

17. The process of claim 15, wherein said macerating step includes the steps of:
    (i) washing said Jerusalem artichoke tubers;
    (ii) dicing said washed Jerusalem artichoke tubers;
    (iii) macerating said diced, washed, Jerusalem artichoke tubers to medium sizes; and
    (iv) further macerating said medium sized, macerated Jerusalem artichoke tubers to fine sizes,
thereby to provide a pumpable, fluid homogenate of at least about 80% by weight liquid.

18. The process of claim 16 wherein said dicing step provides cubes of about 1 cm in size.

19. The process of claim 17, wherein said dicing step provides cubes of about 1 cm in size.

20. The process of claim 18 wherein said macerating to medium sizes provides solids having a maximum size of about 3.2 mm.

21. The process of claim 19 wherein said macerating to medium sizes provides solids having a maximum size of about 3.2 mm.

22. The process of claim 20 wherein said macerating to fine sizes provides solids having a size of about 0.03 to about 0.05 mm.

23. The process of claim 21 wherein said macerating to fine sizes provides solids having a size of about 0.03 to about 0.05 mm.

24. The process of claim 14, wherein said acidulant is acetic acid, which is added to provide a pH of about 3.5 to about 5.5.

25. The process of claim 15, wherein said acidulant is acetic acid, which is added to provide a pH of about 3.5 to about 5.5.

26. The process of claim 24 wherein the amount of said acid which is added is inversely related to the heating temperature.

27. The process of claim 25 wherein the amount of said acid which is added is inversely related to the heating temperature.

28. The process of claim 26 wherein about 1/100 by volume of said acid is added when the temperature is about 90° C. at atmospheric pressure.

29. The process of claim 27 wherein about 1/100 by volume of said acid is added when the temperature is about 90° C. at atmospheric pressure.

30. The process of claim 26 wherein about 1/1000 by volume of acid is added when the temperature is about 150° C. at superatmospheric pressure.

31. The process of claim 27 wherein about 1/1000 by volume of acid is added when the temperature is about 150° C. at superatmospheric pressure.

32. The process of claim 14, wherein said heating is carried out by steam injection.

33. The process of claim 15, wherein said heating is carried out by steam injection.

34. The process of claim 1 wherein said macerating steps are carried out under an atmosphere of nitrogen or carbon dioxide.

35. The process of claim 2 wherein said macerating steps are carried out under an atmosphere of nitrogen or carbon dioxide.

* * * * *